(12) United States Patent
Spaltro et al.

(10) Patent No.: US 9,501,329 B2
(45) Date of Patent: Nov. 22, 2016

(54) METHODS AND SYSTEMS FOR CLOUD COMPUTING MANAGEMENT

(75) Inventors: Dan Di Spaltro, San Francisco, CA (US); Alex Polvi, San Francisco, CA (US); Logan Welliver, San Francisco, CA (US)

(73) Assignee: Rackspace US, Inc., San Antonio, TX (US)

( * ) Notice: Subject to any disclaimer, the term of this patent is extended or adjusted under 35 U.S.C. 154(b) by 646 days.

(21) Appl. No.: 12/777,218

(22) Filed: May 10, 2010

(65) Prior Publication Data

US 2011/0131335 A1 Jun. 2, 2011

Related U.S. Application Data

(60) Provisional application No. 61/176,841, filed on May 8, 2009.

(51) Int. Cl.
| | |
|---|---|
| *G06F 15/16* | (2006.01) |
| *G06F 9/50* | (2006.01) |
| *H04L 29/08* | (2006.01) |

(52) U.S. Cl.
CPC ............ *G06F 9/5072* (2013.01); *H04L 67/02* (2013.01); *H04L 67/04* (2013.01)

(58) Field of Classification Search
CPC .............................. H04L 67/02; H04L 67/04
USPC ......................................................... 709/228
See application file for complete search history.

(56) References Cited

U.S. PATENT DOCUMENTS

| | | |
|---|---|---|
| 6,880,002 B2 | 4/2005 | Hirschfeld et al. |
| 7,644,171 B2 | 1/2010 | Sturniolo |
| 7,698,416 B2 | 4/2010 | Potti |
| 7,778,260 B2 | 8/2010 | Sturniolo |
| 7,831,697 B2 | 11/2010 | Fukushima |
| 7,886,038 B2 | 2/2011 | Ferris |
| 7,996,525 B2 | 8/2011 | Stienhans |
| 8,023,425 B2 | 9/2011 | Raleigh |
| 8,065,395 B2 | 11/2011 | Burch |
| 8,107,945 B2 | 1/2012 | Heffner |
| 8,108,912 B2 | 1/2012 | Ferris |
| 8,117,317 B2 | 2/2012 | Klimentiev |
| 8,156,121 B2 | 4/2012 | Reese |
| 8,209,415 B2 | 6/2012 | Wei |
| 8,219,653 B1 | 7/2012 | Leagy |
| 8,229,812 B2 | 7/2012 | Raleigh |
| 8,239,509 B2 | 8/2012 | Ferris |
| 8,250,207 B2 | 8/2012 | Raleigh |
| 8,250,215 B2 * | 8/2012 | Stienhans et al. ............ 709/227 |
| 8,270,310 B2 | 9/2012 | Raleigh |
| 8,270,952 B2 | 9/2012 | Raleigh |

(Continued)

*Primary Examiner* — Adnan Mirza
(74) *Attorney, Agent, or Firm* — Haynes and Boone, LLP

(57) ABSTRACT

Disclosed is a management service that enables a user to establish, monitor, and control cloud computing sessions offered via third-party service providers. In some instances, the management service establishes a market space that allows a user to establish a customized cloud computing session based on computing resources offered by third-party service providers. In some instances, the management service instantiates monitoring mechanisms within the virtual servers of the cloud computing sessions to be able to monitor, assess, and provide reports and alerts pertaining to performance metrics of the various virtual servers. In some instances, the management service also allows a user to remotely transfer services from a first cloud computing session to a second cloud computing session.

50 Claims, 9 Drawing Sheets

(56) References Cited

U.S. PATENT DOCUMENTS

| | | | |
|---|---|---|---|
| 8,275,830 B2 | 9/2012 | Raleigh | |
| 8,286,232 B2 | 10/2012 | Carter | |
| 2003/0051021 A1 | 3/2003 | Hirschfeld et al. | |
| 2003/0105810 A1* | 6/2003 | McCrory et al. | 709/203 |
| 2009/0249335 A1 | 10/2009 | Vasilevsky | |
| 2009/0249336 A1 | 10/2009 | Vasilevsky | |
| 2009/0249337 A1 | 10/2009 | Vasilevsky | |
| 2009/0284579 A1 | 11/2009 | Knaz | |
| 2009/0284580 A1 | 11/2009 | Knaz | |
| 2009/0285130 A1 | 11/2009 | Knaz | |
| 2009/0285131 A1 | 11/2009 | Knaz | |
| 2009/0293056 A1 | 11/2009 | Ferris | |
| 2009/0299920 A1 | 12/2009 | Ferris | |
| 2009/0300210 A1 | 12/2009 | Ferris | |
| 2009/0300423 A1 | 12/2009 | Ferris | |
| 2009/0300607 A1 | 12/2009 | Ferris | |
| 2009/0300608 A1* | 12/2009 | Ferris et al. | 718/1 |
| 2009/0300635 A1 | 12/2009 | Ferris | |
| 2009/0323799 A1* | 12/2009 | McDade, Sr. | 375/240.01 |
| 2010/0042796 A1 | 2/2010 | Vasilevsky | |
| 2010/0042942 A1 | 2/2010 | Vasilevsky | |
| 2010/0042992 A1 | 2/2010 | Vasilevsky | |
| 2010/0042993 A1 | 2/2010 | Vasilevsky | |
| 2010/0042994 A1 | 2/2010 | Vasilevsky | |
| 2010/0050172 A1 | 2/2010 | Ferris | |
| 2010/0057631 A1 | 3/2010 | Warner | |
| 2010/0070876 A1 | 3/2010 | Jain | |
| 2010/0094674 A1 | 4/2010 | Marriner | |
| 2010/0122184 A1 | 5/2010 | Vonog | |
| 2010/0125473 A1* | 5/2010 | Tung et al. | 705/7 |
| 2010/0131324 A1 | 5/2010 | Ferris | |
| 2010/0131574 A1 | 5/2010 | Reese | |
| 2010/0131624 A1 | 5/2010 | Ferris | |
| 2010/0131649 A1 | 5/2010 | Ferris | |
| 2010/0131754 A1 | 5/2010 | Bells | |
| 2010/0131851 A1 | 5/2010 | Reese | |
| 2010/0131882 A1 | 5/2010 | Reese | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0132023 A1 | 5/2010 | Reese | |
| 2010/0138521 A1 | 6/2010 | DeHaan | |
| 2010/0138526 A1 | 6/2010 | DeHaan | |
| 2010/0138696 A1 | 6/2010 | DeHaan | |
| 2010/0158239 A1 | 6/2010 | Anisimov | |
| 2010/0188990 A1 | 7/2010 | Raleigh | |
| 2010/0188991 A1 | 7/2010 | Raleigh | |
| 2010/0188992 A1 | 7/2010 | Raleigh | |
| 2010/0188993 A1 | 7/2010 | Raleigh | |
| 2010/0188995 A1 | 7/2010 | Raleigh | |
| 2010/0190470 A1 | 7/2010 | Raleigh | |
| 2010/0235539 A1 | 9/2010 | Carter | |
| 2010/0235630 A1 | 9/2010 | Carter | |
| 2010/0241731 A1 | 9/2010 | Du | |
| 2010/0280923 A1 | 11/2010 | Summer | |
| 2010/0289652 A1 | 11/2010 | Javey | |
| 2010/0299366 A1 | 11/2010 | Stienhans | |
| 2010/0306337 A1 | 12/2010 | DeHaan | |
| 2010/0306354 A1 | 12/2010 | DeHaan | |
| 2010/0306377 A1 | 12/2010 | DeHaan | |
| 2010/0306379 A1 | 12/2010 | Ferris | |
| 2010/0306380 A1 | 12/2010 | Dehaan | |
| 2010/0306765 A1 | 12/2010 | DeHaan | |
| 2010/0306767 A1 | 12/2010 | DeHaan | |
| 2010/0319004 A1 | 12/2010 | Hudson | |
| 2010/0332373 A1 | 12/2010 | Crabtree | |
| 2010/0332629 A1 | 12/2010 | Cotugno | |
| 2011/0010732 A1 | 1/2011 | Opdycke | |

* cited by examiner

CLOUD COMPUTE SERVICES

Creating a Cloud Service

| | | | |
|---|---|---|---|
| 303 — Choose provider: | Amazon | Slice Host | Any provider (including combination of providers) |
| 305 — Duration of requirement: | ____ hrs | | |
| 307 — Availability of service: | Non-stop | Peak hours | Non-peak hours |
| 309 — Cost vs. performance sliding scale: | ► Low Cost ▨▬▬ 315 ► High Performance | | |
| 311 — Redundancy options: | Create full backup | Limited backup | No backup |
| 313 — Server Layout options: | Apache server | X server layout | No preference |
| 319 — Geographic Preference: | Distributed across indicated geographic locations | | No preference |

OPTIONS BASED ON YOUR PREFERENCES

SORT BY: COST : PERFORMANCE : PROVIDER

350

352

| Select | Option 1 | Provider: Amazon® & Slice Host® (combined)<br>Number of VM servers: 3<br>Duration: 3 hours daily from 11 PM - 2 AM<br>Redundancy: None<br><br>Additional Details | Cost<br>$XYZ.XY |

354

| Select | Option 2 | Provider: Slice Host®<br>Number of VM servers: 4<br>Duration: 2 hours daily from 6 AM - 8 AM<br>Redundancy: Only for storage<br><br>Additional Details | Cost<br>$XYZ.XY |

356

| Select | Option X | Provider: XYZ<br>Number of VM servers: 24<br>... | Cost<br>$XYZ.XY |

358

| Select | BID YOUR OWN PRICE | Bid you own price and we will try to find a configuration that matches your selections! | BID AMOUNT: ☐ |

*FIG. 6*

METHODS AND SYSTEMS FOR CLOUD COMPUTING MANAGEMENT

CLAIM OF PRIORITY AND CROSS-REFERENCE TO RELATED APPLICATIONS

This application claims priority to U.S. Provisional Patent Application No. 61/176,841, entitled METHODS AND SYSTEMS FOR CLOUD COMPUTING MANAGEMENT, filed May 8, 2009, which is hereby incorporated by reference in its entirety.

FIELD OF THE INVENTION

Embodiments described in this application pertain to cloud computing technology, and more particularly, to techniques for management of cloud computing services offered by service providers, the techniques including establishing a market space for cloud computing services, monitoring and reporting of performance metrics associated with cloud computing services offered by various service providers, and providing capabilities to enable users to transfer cloud computing services from one service provider to another.

BACKGROUND

There are many situations in which an individual user or an organization may desire to lease one or more server computer systems on a short or long-term basis. Examples include educational or classroom services, demonstration of software to potential users or buyers, website server applications, etc. The servers may be pre-configured with selected operating systems and application software as desired. Although physical servers may be leased and physically delivered for onsite use, servers may also be leased from a central or remote location and accessed via an intermediate network system, such as the Internet. The primary considerations for remote access include the capabilities of the remote access software and the network connection or interface.

Remote access technology is known and many variations exist, such as Microsoft Terminal Server, Citrix MetaFrame, Symantec pcAnywhere, VMware Remote Console, etc. In general, local client software operates on a client computer that enables communication with server software operating on a server computer. Generally, the client software provides keyboard and mouse commands and receives video and audio information and there is little or no local client processing necessary. Server providers may also desire to share a single physical server among multiple users to more efficiently utilize server resources. Many remote access systems enable multiple access by simultaneously activating separate user sessions. Although some files may be shared, other files or directories or even disk drives may have permission-based attributes so that only authorized persons have access. The same may be true for other physical or software resources existing on or coupled to the physical server. Although multiple access to a single physical server has many benefits, it may be desired to provide a greater degree of isolation between or independence among the users for a variety of reasons, such as, for example, improved security. Also, each user may be detrimentally affected by activities of or problems caused by one or more other users. If any user causes accidental or intentional shutdown of the physical computer or any physical resources associated therewith, or uploads a virus or the like, all users may be detrimentally affected.

One solution is the use of virtualization technology that enables multiple servers to operate on a single physical computer. One means of utilizing such virtualized servers (or simply, "virtual servers") is by use of a cloud computing environment. Cloud computing is a style of computing in which dynamically scalable and virtualized resources are provided as a service over the Internet. Users need not have knowledge of, expertise in, or control over the technology infrastructure in the cloud that supports them. The cloud computing concept incorporates infrastructure as a service (IaaS), platform as a service (PaaS) and software as a service (SaaS) as well as Web 2.0 and other technology trends that have the common theme of reliance on the Internet for satisfying the computing needs of the users. Cloud computing services, for example, provide common business applications online that are accessed from a web browser, while the software and data are stored on the physical servers.

SUMMARY

At least one embodiment of the invention pertains to a management service that enables a user to establish, monitor, and control cloud computing sessions offered via third-party service providers. In some instances, the management service establishes a market space, allowing a user to pick and choose one or more parameters associated with establishing a cloud computing session. Using these input selections, the management service communicates with third-party service providers to establish a cloud computing session that matches the user's desired criteria.

In some instances, the management service instantiates monitoring mechanisms within the virtual servers of the cloud computing sessions to be able to monitor, assess, and provide reports and alerts pertaining to performance metrics of the various virtual servers. In some instances, the management service also allows a user to remotely transfer services (e.g., the virtual servers) from a first cloud computing session to a second cloud computing session without losing data or process operations by acting as a type of mediator between the two cloud computing sessions.

Other advantages and features will become apparent from the following description and claims. It should be understood that the description and specific examples are intended for purposes of illustration only and not intended to limit the scope of the present disclosure.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 depicts an exemplary graphical user interface of the management server;

FIG. 6 is a second exemplary graphical user interface of the management server;

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. The techniques described herein may be embodied in several forms and manners. The description provided below and the drawings show exemplary embodiments of the invention. Those of skill in the art will appreciate that the techniques may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
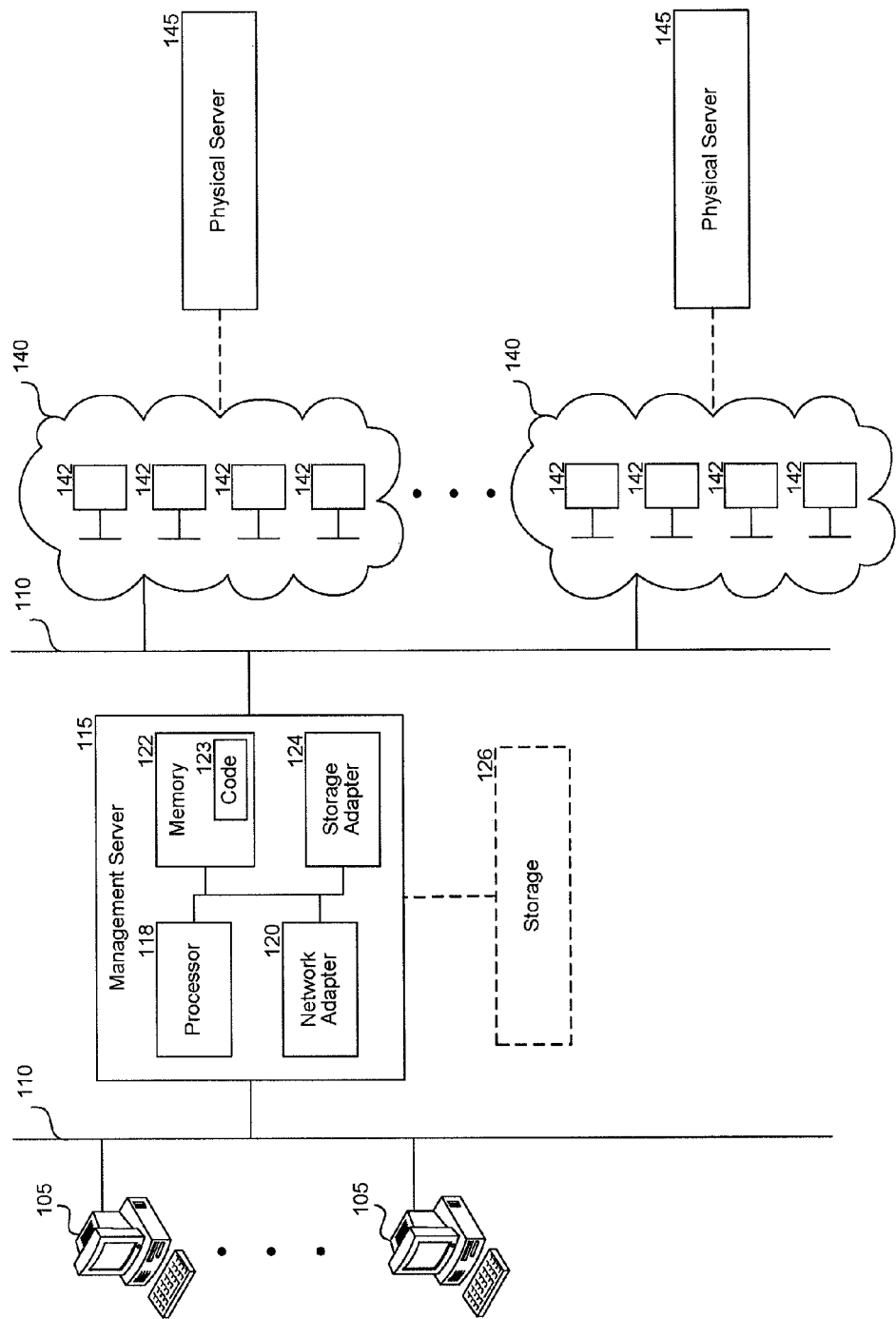
FIG. 1 shows a network based cloud computing system in which the techniques introduced herein can be implemented.

Refer now to FIG. 1, which shows a network based cloud computing system in which the techniques being introduced here can be implemented. In FIG. 1, users 105 of cloud computing services connect to a management server 115 through an interconnect 110. The interconnect 110 may be, for example, a local area network (LAN), wide area network (WAN), metropolitan area network (MAN), global area network such as the Internet, a Fibre Channel fabric, or any combination of such interconnects. Each of the clients (or users) 105 may be, for example, a conventional personal computer (PC), server-class computer, workstation, hand-held computing/communication device, or the like.

The management server 115, as described herein, refers to one or more computing servers that are configured to provide the various cloud computing management services described in this application. In an exemplary architecture as illustrated in FIG. 1, the management server 115 includes one or more processors 118 and memory 122 coupled to an interconnect 119. The interconnect 119 shown in the management server 115 is an abstraction that represents any one or more separate physical buses, point-to-point connections, or both, connected by appropriate bridges, adapters, or controllers. The interconnect 119, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 118 is/are the central processing unit (CPU) of the management server 115 and, thus, control the overall operation of the management server 115. In certain embodiments, the processor(s) 118 accomplish this by executing software or firmware stored in memory 122. The processor(s) 118 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 122 is or includes the main memory of the management server 115. The memory 122 represents any form of random access memory (RAM), read-only memory (ROM), flash memory, or the like, or a combination of such devices. In use, the memory 122 may contain, among other things, code 123 embodying the functional blocks of the management server 115. Several such functional blocks are described, for example in the management server 115 block described in FIG. 2. The Also connected to the processor(s) 201 through the interconnect 203 are a network adapter 120 and a storage adapter 124. The network adapter 120 provides the management server 115 with the ability to communicate with remote devices, such as clients 105 or cloud computing blocks 140, over the interconnect 110 and may be, for example, an Ethernet adapter or Fibre Channel adapter. The storage adapter 124 allows the management server 115 to access, for example, the storage 126 and may be, for example, a Fibre Channel adapter or SCSI adapter.

In one embodiment, the management server 115 uses a storage system 126 for persistent storage purposes, including, for example, buffering of data received from the various cloud computing blocks 140, storing information related to metrics recorded from the cloud computing blocks 140, etc. The storage system 126 may include a number of nonvolatile storage devices, which can be, for example, conventional magnetic or optical disks or tape drives; alternatively, they can be non-volatile solid-state memory, such as flash memory, or any combination of such devices.

FIG. 1 further illustrates one or more cloud computing blocks 140. A cloud computing block 140, as described herein, refers to a cloud of virtualized computing servers offered by a particular cloud computing service provider (or simply, a "service provider"). Each cloud computing block 140 includes one or more virtualized computing servers 142 (or simply, "virtual servers"). The virtual servers 142 are established in response to a request from a particular user, when the request is, for example, routed through the management server 115. In some instances, the virtual servers 142 in each cloud computing block 145 are instantiated by a physical server 145 operated by the respective service provider. A service provider, as referred to herein, may at least in some examples be a third party service provider, implying that the entity associated with the service provider is different from the entity associated with the management server 115. The physical server 145, as maintained by the associated service provider, comprises server architecture (e.g., similar to the architecture of the management server 115 as described above) to establish and host a virtual server 142 in a cloud computing block 140. The service provider may maintain physical servers in different geographic locations to establish and provide the cloud computing blocks. Examples of commercially available service providers include, for example, Amazon®, Slicehost®, Google®, Go Grid®, etc.

The management server 115 connects to the cloud computing blocks 140 through the interconnect 110. It is noted that, in at least some instances, the interconnect 110 connecting the user 105 to the management server 115 is the same as the interconnect 110 connecting the management server 115 to the cloud computing blocks 140. This basic exemplary network system of FIG. 1 illustrates the platform on which the various techniques described below can be implemented.

Figure 2:
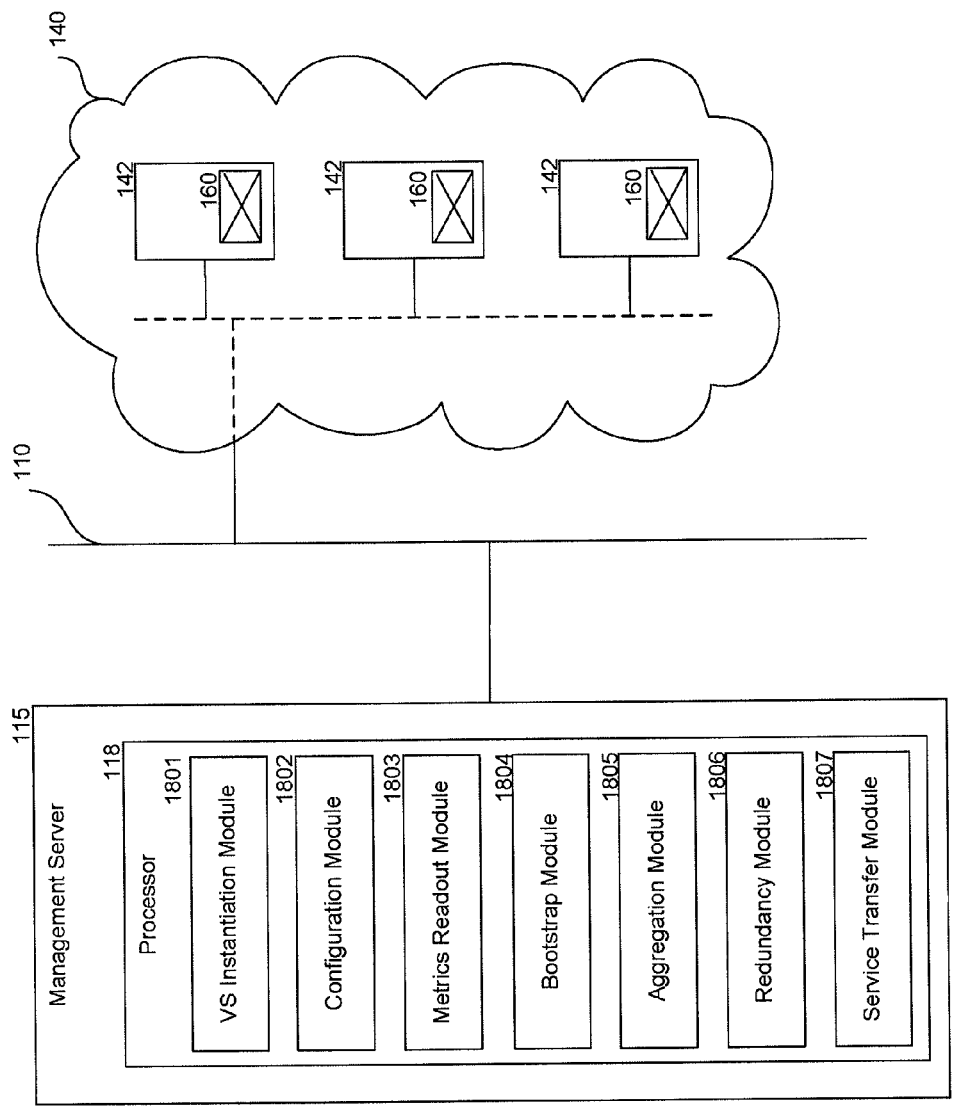
FIG. 2 is an exemplary architecture of the management server, illustrating computational blocks adapted to perform the various techniques described herein.

FIG. 2 is an exemplary architecture of the management server 115, illustrating computational blocks adapted to perform the various techniques described herein. As described above, the management server 115 includes one or more processors 118 to perform the techniques described here. In the illustrated embodiment, the processor 118 includes the various computational blocks as functional units. In other embodiments, the computational blocks may be separate components from the processor 118. In certain embodiments, the computational blocks may be implemented in the form of software (executed by one or more programmable processors). In other embodiments, however, these computational blocks may be implemented in pure hardware, e.g., specially-designed dedicated circuitry, or as a combination of software and specially-designed dedicated circuitry.

It is noted that the list of modules (i.e., the computational blocks) indicated in FIG. 2 are for illustrative purposes. Other modules, as would be useful to perform logical and deterministic functions of the various techniques described here, are considered to be included in the list of computational blocks. A first computational block, the VS Instantiation Module 1801 includes computational logic to enable a user to instantiate one or more virtual servers 142 in one or more cloud computing blocks 140. In some instances, the management server 115 receives requests from a user 105 to establish one or more virtual servers 142. The user 105 may indicate specific parameters to establish the virtual servers 142. An exemplary interface allowing the user to select and enter such parameters is described below with reference to FIGS. 4 and 5 below.

Consider an example where the user 105 requests (through the interface of the management server 115) four virtual servers 142 (each with a particular performance capacity) from a first service provider and two virtual servers 142 from a second service provider. The VS instantiation module 1801 of the management server 115 processes the request by first establishing a connection through interconnect 110 with, for example, an operating interface (not shown in FIG. 2) of each service provider. The VS instantiation module 115 may utilize one or more communication protocols to establish the connection with the operating interface and exchange communications regarding the required specification. In some instances, the operating interface of each service provider (or a physical server associated with each service provider) establishes the required number of virtual servers 142 in the respective cloud computing blocks 140 and returns the setup information back to the VS instantiation module 1801. The VS instantiation module 1801 then communicates this information back to the user 105, enabling the user to start utilizing the newly established virtual servers 142. Therefore, the user 105 is able to establish multiple virtual servers with multiple service providers through one centralized operation, and is spared the need of separately interfacing with each service provider to establish the required virtual servers.

In some instances, the management server 115 includes a configuration module 1802. The configuration module 1801 operates in tandem with other computational blocks in the management server 115 to maintain and share configuration information related the various virtual servers 142 established using the management server 115. For example, in some instances, the configuration module 1802 works in tandem with the VS instantiation module 1801 to retrieve information related to the various virtual servers 142 established for a given user (e.g., cloud computing block 140 associated with each virtual server 142, performance capacity of each virtual server 142, operable hours of each virtual server 142, user-specific settings associated with each virtual server 142, redundant storage options associated with each virtual server 142, etc.).

In some instances, the configuration module 1802, in addition to performing the above mentioned functions, also periodically queries service providers associated with the management server 115 to obtain relevant information related to the service providers. The configuration module 1802, for example, communicates with an operating interface of each service provider to obtain information related to available bandwidth, retail cost of establishing virtual servers with the service provider, wholesale cost of establishing virtual servers with the service provider, storage options offered by the service provider, cost based on usage hours of the virtual servers, geographic location of physical servers maintained by the service provider, etc. The configuration module 1802 causes such information to be stored in the management server 115 for subsequent use in generating a list of potential cloud computing configurations (as will be explained in detail below with reference to FIGS. 5 and 6).

The management server 115 also includes a metrics readout module 1803, adapted to monitor, retrieve, and record performance metrics associated with the various virtual servers 142. A user 105 would find it useful to be aware of the various performance metrics associated with the virtual servers 142 that may affect his user experience and also the efficiency of operation of the virtual servers 142. For example, the user 105 would find it advantageous to be aware of the load (memory load, processor load, etc.) on the physical server associated with the cloud computing block 140 hosting his virtual servers 142. The metrics readout module 1803 is adapted to monitor performance metrics related to each virtual server 142 instantiated through the management server 115.

The metrics readout module 1803 monitors both computing performance and I/O related performance metrics associated with the virtual servers 142. Examples of computing performance metrics include load on the physical server associated with the virtual server 142, available memory in the associated physical server, the number of processes running in the physical server, processor performance, processor capacity, etc. Examples of I/O related performance metrics include bandwidth of the communication bus to each virtual server (e.g., an FSB bandwidth), I/O throughput times of communication between memory and the processor of the associated physical server, network communication between two virtual servers 142 of a particular cloud computing block 140, network communication between two cloud computing blocks 140 (e.g., where a user has virtual servers established through two different service providers), etc.

In some instances, the metrics readout module 1803 uses instrumentation bootstraps 160 instantiated in each virtual server 142 to monitor the performance of each virtual server 142. In one embodiment, the VS instantiation module 1801 functions in tandem with a bootstrap module 1804 to instantiate the instrumentation bootstraps 160 in each virtual server. In some instances, the VS instantiation module 1801 may install the instrumentation bootstrap 160 as a regular feature while instantiating each virtual server 142. In other instances, where the metrics readout feature is offered as a premium feature, the VS instantiation module 1801 may install the instrumentation bootstrap 160 when the user specifically requests the metrics readout as a premium feature. The instrumentation bootstrap, in one embodiment, is a series of background processes running on each virtual server 140 to monitor and collect the information from the virtual servers 142 either periodically or upon specific requests from the management server 115.

In one embodiment, the management server 115 includes an aggregation module 1805 to record, for example, the various metrics reports, in an aggregated manner. The aggregation module 1805, for example, works in tandem with the metrics readout module 1803 to retrieve metrics reports received from each of the virtual servers 142. The metrics reports returned to the metrics readout module 1805 may be in raw format and consequently may not be immediately useful to the user 105. Additionally, because several metrics are collected at regular intervals, the volume of data collected needs to be synthesized to a structured format to enable the user 105 to readily perceive useful information from the metrics readouts. The aggregation module 1805 retrieves the raw readouts from the metrics readout module 1803 and post-processes the data to a synthesized format (e.g., in the form of a spread sheet, in the form of a visual alert display, in the form of a scrolling display, etc.).

The management server 115 may also include a redundancy module 1806. In some instances, the management server 115 offers a redundancy feature to the user 105, as, for example, a premium feature. Using this redundancy feature, a user may be able to backup virtual servers 142 and/or stored data. The user 105 may configure the management server setting to indicate that a redundant virtual server should be established in the same cloud computing block 140 as the original virtual server 142. In other instances, a user 105 may prefer the redundant virtual server to be established in another cloud computing block. In other instances, the user 105 may prefer to maintain multiple redundant virtual servers as an enhanced precautionary measure. The redundancy module 1806, depending on the choice indicated by the user 105, establishes one or more redundancy features. Every time a new process is initiated, terminated, or modified in the original virtual server 142, the redundancy module 1806 replicates the operation in the redundant virtual servers. This ensures, for example, that the redundant virtual servers are ready to take over for the original virtual server 142 should the original virtual server 142 suffer a failure.

The management sever 115 may also include a service transfer module 1807, adapted to enable a user 105 to transfer one or more virtual servers 142 from a first cloud computing block 140 to a second cloud computing block (not shown in FIG. 2). The functionality of the service transfer module 1807 is described in detail with reference to FIG. 3 below.

Figure 3:
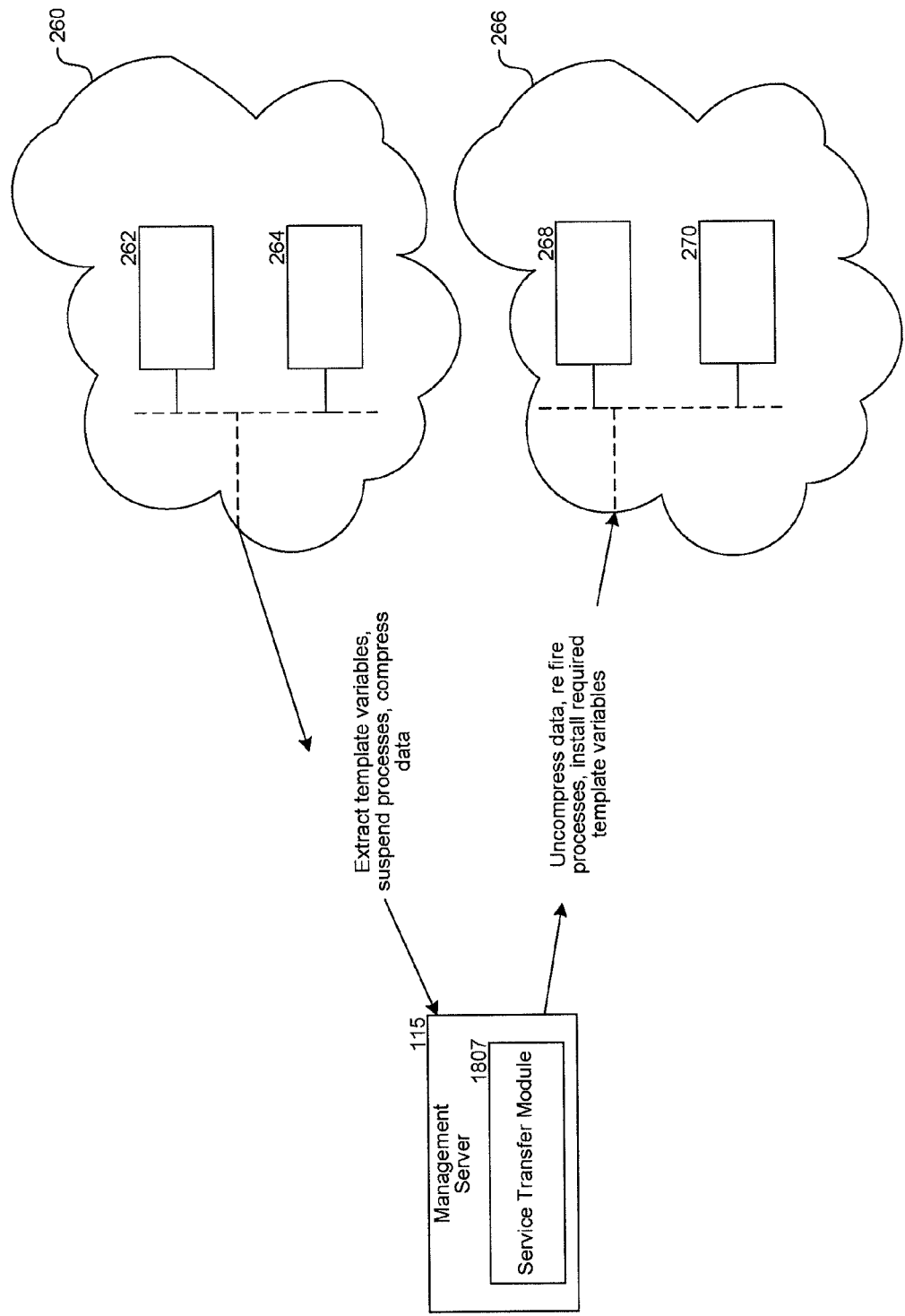
FIG. 3 illustrates an exemplary service transfer mechanism offered by the management server.

FIG. 3 illustrates an exemplary service transfer mechanism offered by the management server 115. In one embodiment, the management server 115, as indicated above, includes a service transfer module 1807 to perform the various functionalities of the service transfer mechanism. The phrase "service transfer," as referred to herein, refers to a sequence of operations involved in transferring one or more virtual servers (e.g., 262, 264) from a first cloud computing block 260 (of a first service provider) to a second cloud computing block 266 (of a second service provider).

The following section details one possible mechanism for transferring the virtual servers from the first cloud computing block 260 to the second cloud computing block 266. It is understood, however, that other possible mechanisms for suspending and reinitiating operations of a server, as known by one of skill in the art, may also be utilized in performing the transfer operation. In one embodiment, the service transfer module 1807 receives a request initiated by a user 105 (through the management server 115) to transfer virtual servers (262, 264) from a first cloud computing block 260 to a second cloud computing block 266. The first cloud computing block 260 and the second cloud computing block 266, in some instances, is operated by two different service providers.

Subsequent to receiving the request, the service transfer module 1807 identifies the various virtual servers (262, 264) to be transferred. In some instances, the service transfer module 1807 may communicate with the configuration module 1802 to retrieve information related to the virtual servers (e.g., the cloud computing block associated with the virtual servers, etc.). The service transfer module 1807 then initiates the service transfer operation by suspending all active processes in the virtual servers 262, 264 that are to be transferred. The service transfer module 1807 then retrieves the parameters associated with each virtual server 262, 264 that are specific to the cloud computing block (e.g., configuration files as they apply to 2 particular cloud computing block, etc., redundant virtual machine setup information, etc.). In one embodiment, the service transfer module 1807 operates on all hypervisors to ensure that processes specific to each hypervisor is selectively suspended.

In some instances, the service transfer module 1807 then compresses and encrypts information related to the processes, setup information of the virtual servers, local storage data associated with the virtual servers 262, 264. In one embodiment, the service transfer module 1807 retrieves the compressed data and stores it temporarily in a storage unit associated with the management server 115 (e.g., the persistent storage 126). In other embodiments, the service transfer module 1807 retrieves the compressed data and stores it temporarily in a temporary cloud computing block (not shown in FIG. 3) until subsequent operations are performed. Additionally, in some instances, the service transfer module 1807 decrypts and/or uncompresses the temporarily stored data prior to transferring the virtual machines to the second cloud computing block 266.

In some instances, the service transfer module 1807 works in tandem with the VS instantiation module 1801 to instantiate a new set of virtual servers 268, 270 in the second cloud computing block 266. The service transfer module 1807 may establish the new virtual servers 268, 270 based on one or more considerations. For example, the new virtual servers 268, 270 may be such that they have similar performance capabilities as compared to the previous virtual servers 262, 264. In another example, the new virtual servers 268, 270 may be matched with the previous virtual servers 268, 270 in terms of cost. That is, if the first cloud computing block 260 offers virtual servers for a more expensive rate, the performance capacities of virtual servers 268, 270 may be increased (compared to the respective previous virtual servers 262, 264) to a level commensurate with the previous cost. Still other permutations and combinations, as would be appreciated by a person of skill in the art, are additionally applicable for establishing the new virtual servers 268, 270. It is also noted that the service transfer module 1807 may cause a different number of virtual servers (as compared to the number of servers being suspended and removed from the first cloud computing block 260) to be generated. For example, the second cloud computing block 266 may have four smaller virtual servers to replace two larger virtual servers from the first cloud computing block 260.

Subsequent to establishing the new virtual servers 268, 270, in some instances, the service transfer module 1807 transfers the uncompressed and unencrypted data to the new virtual servers 268, 270. Additionally, the service transfer module 1807 retrieves the parameterized values extracted from the first cloud computing block and applies the parameterized values to the new virtual servers 268, 270. Since, in at least some instances, the parameterized values (e.g., configuration variables as applied to a particular cloud computing block) vary with respect to the cloud computing block, the service transfer module 1807 adjusts the values to adapt to the requirements of the second cloud computing block 266. Subsequent to installing these template variables (or parameterized values), the service transfer module 1807 initiates the suspended processes captured from the first cloud computing block 260. The service transfer module 1807 of the management server 115 thus enables a seamless transfer of the virtual servers from one cloud computing block to another, without requiring the user to directly interact with either of the cloud computing blocks to achieve the seamless transfer.

Figure 4:
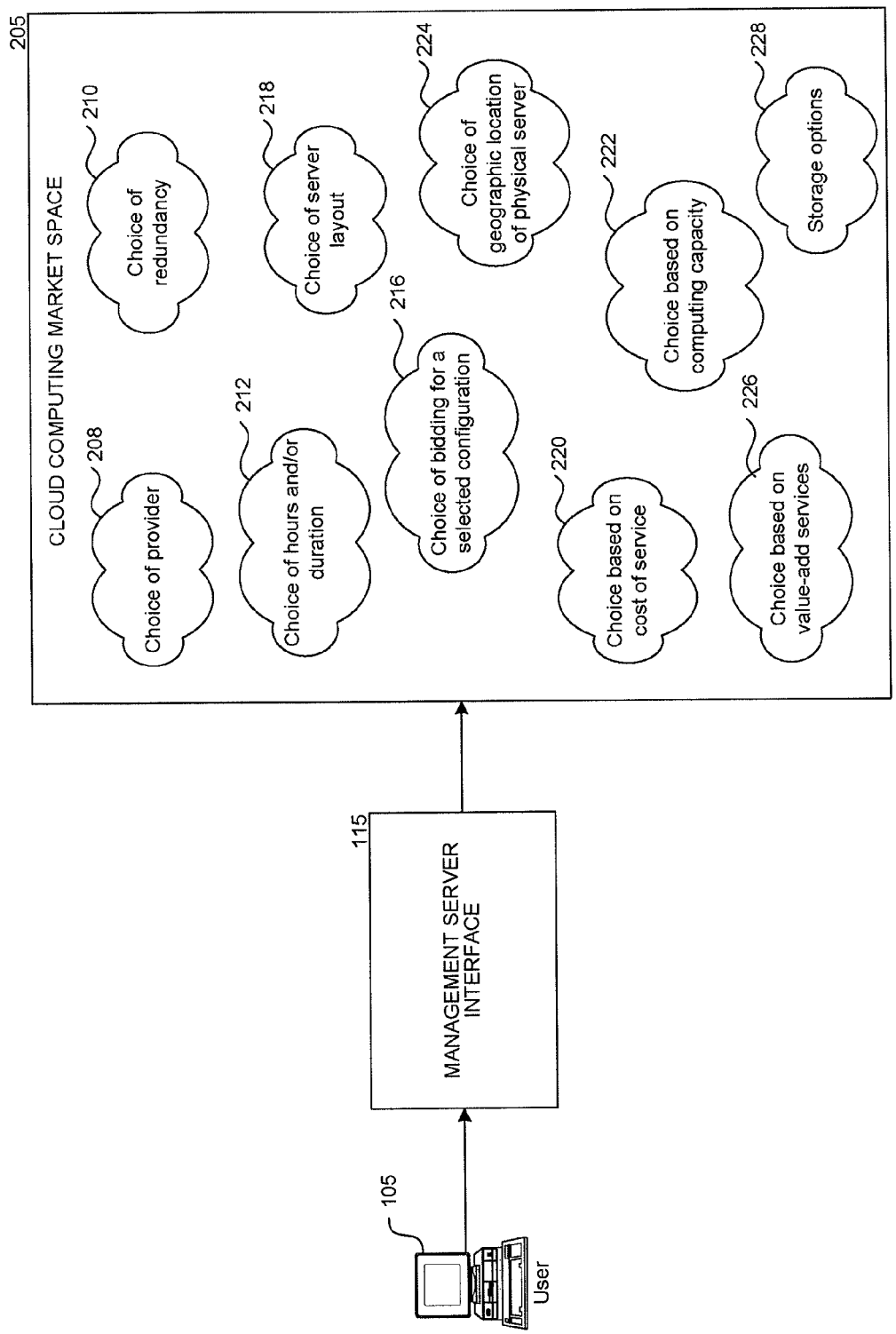
FIG. 4 is an illustration of the market space options offered through the management server.

FIG. 4 is an illustration of market-space options offered through the management server 115. In the illustrated embodiment, a user 105 uses a user interface (not shown in FIG. 4) of the management server 115 to establish a cloud computing environment (by establishing one or more virtual servers). A cloud computing environment, as described herein, refers to a collection of one or more virtual servers established for use by a particular user through the management server. The one or more virtual servers may be operated by one or more service providers.

In some instances, the management server 115 functions as a portal to commercial cloud computing service providers, offering a variety of means to enable the user 105 to establish a customized and defined cloud computing environment. Through the interface, the management server 115 offers a variety of market-space options 205. The user may use one or more of these options to custom-build a cloud computing environment. It is understood that the list of market-space options indicated in FIG. 3 is not meant to be exhaustive, and that other options or variables to enable a user to custom-build a computing environment, as would be appreciated by people of ordinary skill in the art, are additionally applicable. Each of the market-space options illustrated in FIG. 3 are individually discussed below.

A first market-space option, namely a choice of provider option 208, allows a user to select one or more service providers from a list of service providers supported by the management server 115. Examples of such service providers include Amazon®, Google®, Slice Host®, etc. A second market-space option, namely a choice of hours and/or duration 212, allows a user to select the hours and time duration during which he intends to operate the virtual servers. Some service providers may offer the virtual servers at a cheaper rate if the virtual servers are operated during off-peak hours. In such instances, for example, the user has the option of specifying a specific time (or duration of time) during which he intends to operate the virtual machines to take advantage of the cheaper rate.

In some instances, the cloud computing market-space 205 includes a choice of server type and/or layout 218. In such instances, the user 105 has the option of specifying what type of server layout and/or type (e.g., Apache server, X server, other kinds of web server layouts, FTP storage server, etc.). The VS instantiation module 1801, for example, would instantiate each of the virtual servers with the requested server type and/or layout.

Another example of the cloud computing market-space options 205 includes a choice based on cost of service 220. In some instances, the user 105 would be able to indicate a particular cost or range of affordable costs for establishing and operating the virtual servers. Accordingly, in some instances, the management server 115 identifies one or more particular service providers, particular service time durations, etc., that match the user's choice of cost. Additionally, or in lieu of the choice of cost option 220, a user may indicate a desired computing capacity 222 to establish the cloud computing environment. In some instances, the user may balance (e.g., using a sliding scale mechanism as shown in FIG. 5) the cost and performance capacity factors to establish a desired cloud computing environment.

The cloud computing market-space may also offer the user 105 a range of other options, including a choice based on geographic location of the physical server operating the virtual servers. In some instances, a user 105 may prefer the virtual server to be established such that the physical server operating the virtual server is located at an optimal geographic location. Similarly a user may desire multiple virtual servers operated by geographically distributed physical servers (e.g., physical servers operating in every continent or every country). It would be difficult to find one service provider catering to a distributed geographic topography. However, when the user 105 selects the geographic location 224 option of the cloud computing market-space 205, the management server queries the physical server distribution (i.e., the geographic distribution) of each service provider to establish a suitable cloud computing environment for the user 105.

In some instances, the cloud computing market-space options 205 include a choice based on value-add services 226. Using such a choice, a user may include, for example, premium add-on services while establishing the cloud computing environment. Examples of such premium add-on services include logging of performance metrics, reporting of performance alerts, redundancy options, technical maintenance and support, etc. The value-add services may include premium services offered by the respective service providers or services offered by the management server 115. Other options in the cloud computing market-space may include, for example, storage options 228, allowing a user 105 to choose a storage mechanism from a variety of storage options. For example, the user 105 may elect to store data associated with the virtual servers (e.g., user data, log data, etc.) in the persistent storage unit 126 of the management server 115, or may elect to purchase a cloud storage service to store the data.

As illustrated in FIG. 4, the cloud computing market-space features 205 include an option allowing the user 105 to bid for a cloud computing environment 216. The user 105, in some instances, may provide an input on a desired number of features (e.g., computing capacity, duration of operation, etc.) through the interface of the management server 115. In addition, using the bidding option 216, the user may also enter a base price (e.g., a daily rate that the user is willing to pay for each virtual server in the cloud computing environment, etc.) to indicate the bid amount. The management server 115, taking into account the desired features and the bid amount, queries all available service providers to generate a list of suitable cloud computing environment configurations. In some instances, each configuration in the generated list covers a range of features, allowing the user to select one configuration. In some instances, however, when the management server 115 is unable to find any configurations at (or around) the user's bid amount, the management server 115 prompts the user 105 to enter a different bid amount. For example, if the management server 115 may indicate to the user 105 that the cheapest configuration is available at a particular price and that the user 105 should at least match that particular price when entering the bid amount. In some instances, if the management server 115 is unable to find a configuration matching the user's bid amount, the management server 115 may yet reach out (e.g., by transmitting an email or an SMS message, etc.) to the user at a later time when a configuration matching the user's bid amount does become available.

FIG. 5 depicts an exemplary graphical user interface 301 of the management server 115. In one embodiment, as described above, the management server presents a suite of market-space options to enable a user to establish a customized cloud computing environment. The exemplary user interface 301 of FIG. 5 is for the purpose of illustration only, and is not to be construed as a limiting or sole example of the management server's user interface. As illustrated in FIG. 5, a first field 303 of the user interface 301 enables a user to select one or more service providers. The user may select one service provider, or make multiple selections to select more than one service provider, or may even select a feature that allows the management server to utilize any combination of service providers based on other market-space options selected by the user.

A second option 305 enables the user to select a duration during which the user desires to use the cloud computing environment. In one example, the user may merely indicate AM or PM usage. In another example, the user may indicate a time range (10 AM to 10 PM). In another example, the user may just indicate that he needs to use the cloud computing environment for 5 hours every day.

A third option 307 allows the user to indicate a type of availability of the cloud computing environment. In one example, the user may indicate that he intends to use the cloud computing environment only during peak hours. In another example, the user may indicate his preference to use the cloud computing environment only during non-peak hours. A don't-care option (not shown in FIG. 5) may allow the user to indicate that he does not care about when the service would be available.

A fourth option 309, as illustrated in FIG. 5, includes a sliding scale 315 to enable a user to balance computational capacity of the cloud computing environment against the cost of the cloud computing environment. The left corner of the sliding bar indicates a low-cost criterion, while the right corner of the sliding bar indicates a high performance-capacity criterion for establishing the cloud computing environment. The user may choose any point in the spectrum to choose a desired balance between the cost and performance capacity options.

A fifth option 311 provides the user one or more options to select redundancy related features. Redundancy features include, for example, a full virtual server backup, partial backup (e.g., a storage data backup), etc. Alternately, as with other options in the user interface 301, the user may choose a "no preference" option. A server layout option 313 allows the user to select a server layout (e.g., an apache server layout, an X server layout, etc.). If the user selects a layout option, the management server 115 ensures that the virtual servers are established with the selected layout option at the time of establishing the user's cloud computing environment.

The user interface 301 of FIG. 5 also includes a geographic preference 319 option. Using this option, the user can request the management server 115 to identify service providers that operate physical servers in particular geographic locations. By indicating one or more geographic location preferences, the user is able to build a cloud computing environment that, for example, is enabled by geographically distributed physical servers.

FIG. 6 is an exemplary illustration of a selection page 350 that provides a list of potential cloud computing configurations based on the user's inputs. As described with reference to FIG. 5, the user provides a list of options or preferences (through a user interface 301 of the management server 115) for establishing a cloud computing environment. The management server 115 assimilates the information and queries each service provider to determine availability of features. Alternately, in one embodiment, the management server 115 uses information already stored by the configuration module 1802. As described above with reference to FIG. 2, the configuration module 1802 periodically queries each service provider to retrieve and store a list of features and cost options offered by each service provider.

The management server 115 uses the information related to the service providers to build cloud computing configurations. In some instances, a particular configuration may include features from one service provider. In other instances, a particular configuration may incorporate features offered by two or more service providers. 352, 354, and 356 are examples of such potential configurations that are generated based on the user's inputs. Each configuration provides a list of features and associated cost, allowing the user to select a desired configuration. Alternately, or in lieu of the above potential configurations, the selection page 350 may also offer a bidding selection 358. Using this selection, the user may enter a bid amount that he would like to pay for a cloud computing environment that includes the features previously selected by the user.

Figure 7:
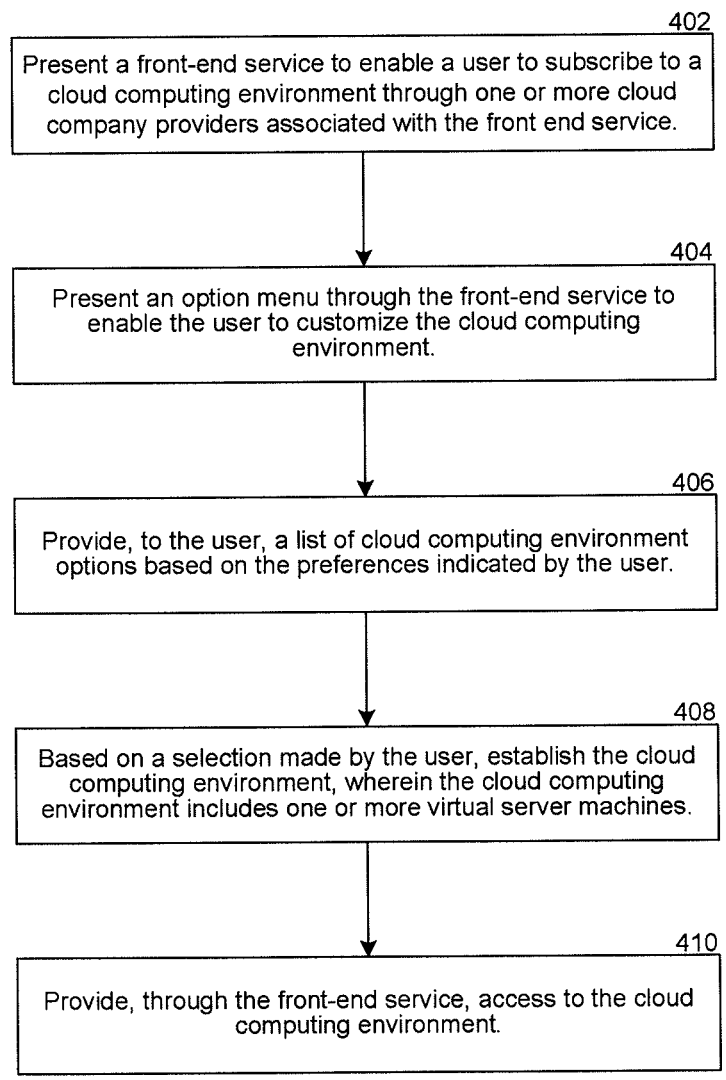
FIG. 7 is a flow diagram of a process for enabling a user to establish a customized cloud computing environment using the service offered by the management server.

FIG. 7 is a flow diagram of a process for enabling a user to establish a customized cloud computing environment using the service offered by the management server. In one embodiment, the management server presents a front-end service to enable a user to subscribe to a cloud computing environment 402. The management server is associated with one or more service providers, and therefore allows the user to build a customized cloud computing environment using features offered by one or more service providers. The management server presents, for example, an options menu through a graphical user interface 404. The options menu presents a list of features for building a customized cloud computing environment, allowing the user to indicate his preferences on various features of the cloud computing environment. For example, using the options menu, the user may indicate a preference of one or more service providers, a preference of geographical location of physical servers operated by the service providers, a number of virtual servers in the cloud computing environment, etc.

After the user selects one or more options from the options menu, the management server assimilates the information and builds a corresponding list of potential cloud computing configurations 406. The management server, using the graphical user interface, presents the list of configurations to the user. An example of such a display page was described previously with reference to FIG. 6. The user selects a particular configuration from the list of configurations.

Subsequent to the user selecting a configuration, the management server communicates with the respective service providers to establish a cloud computing environment corresponding to the selected configuration 408. Based on the selected configuration, such a cloud computing environment may include one or more virtual servers. In some instances, the front-end service of the management server may also provide an interface enabling the user to access the cloud computing environment through the user's terminal 410. In such instances, the management server may use, for example, hypervisor technology to provide the interface.

Figure 8:
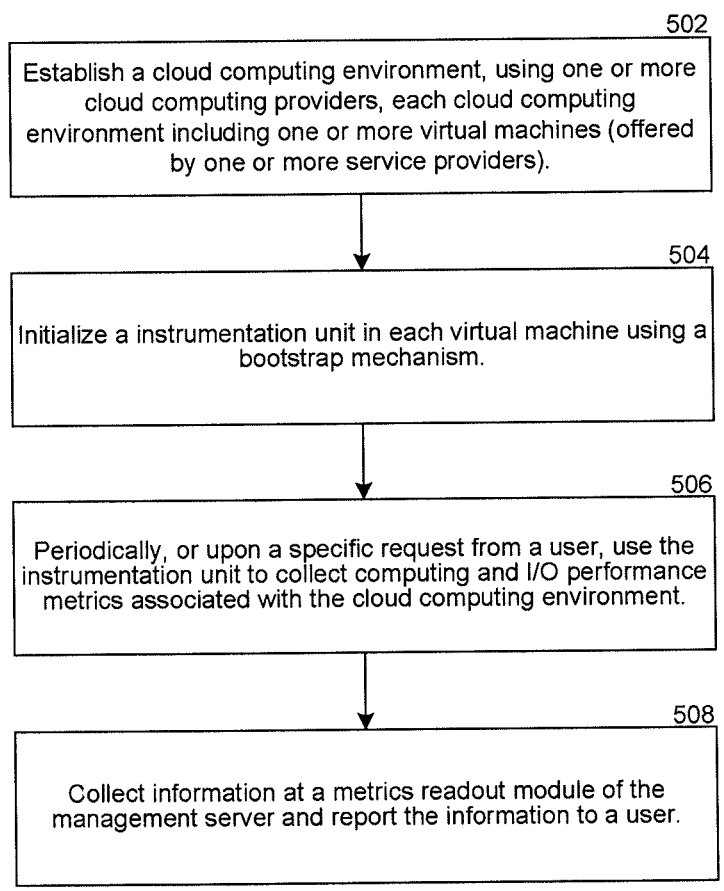
FIG. 8 is a flow diagram of an exemplary process for using the management server to monitor and retrieve performance metrics related to cloud computing environments.

FIG. 8 is a flow diagram of an exemplary process for using the management server to monitor and retrieve performance metrics related to cloud computing environments. In one embodiment, the management server establishes a cloud computing environment based on options indicated by a user using the management server's front-end service 502. The cloud computing environment may include, for example, one or more virtual servers (offered by one or more service providers). These virtual servers, as described above, are accessible through an interconnect (e.g., 110 of FIG. 1).

In some instances, when establishing a virtual server or subsequent to establishing a virtual server in the cloud computing environment, the management server, for example, installs an instrumentation bootstrap within the virtual server 504. The instrumentation bootstrap, as explained above with reference to FIG. 2, may include multiple background processes that are adapted to monitor and record performance metrics associated with the virtual servers. The instrumentation bootstrap, either periodically or upon specific request from a user, collects computing and I/O related performance metrics associated with the virtual servers 506. The management server retrieves the performance metrics from the bootstraps and, in some instances, aggregates the information in user-readable log files. The management server then presents this information to the user 508. In some instances, the management server also uses the metrics information to transmit appropriate alerts and warnings to the user.

Figure 9:
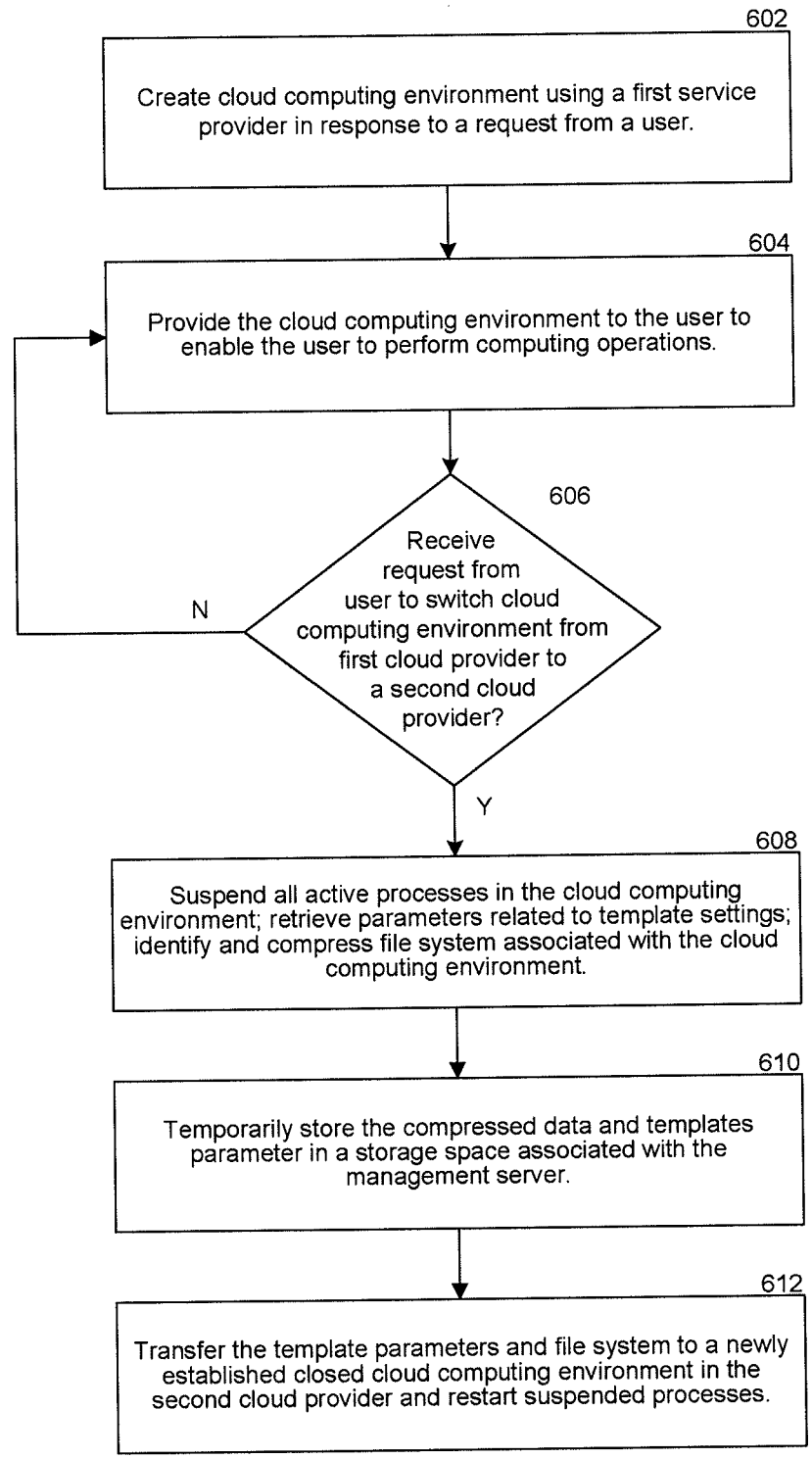
FIG. 9 is a flow diagram depicting a process for enabling a user to transfer a cloud computing environment from a first service provider to a second service provider.

FIG. 9 is a flow diagram depicting a process for enabling a user to transfer a cloud computing environment from a first service provider to a second service provider. In one embodiment, the management server enables the user to establish a cloud computing environment 602. The management server provides the user an interface to the cloud computing environment, allowing the user to perform computing operations in the cloud computing environment 604. The cloud computing environment may include one or more virtual servers. For purposes of illustration, the cloud computing environment is such that all virtual servers within the cloud computing environment are offered by a single service provider. It will be appreciated that the techniques discussed herein may also be extended to cloud computing environments that comprise virtual servers offered by more than one service provider.

The cloud computing environment operates without interruption until a request is received from the user to transfer the cloud computing environment from the first service provider to a second service provider 606. Upon receiving such a request, the management server suspends all active processes in the cloud computing environment, retrieves template related parameters (e.g., configuration variables specific to the first cloud computing environment, etc.), and compresses and encrypts data files associated with the cloud computing environment 608. In some instances, the management server transfers all the files and information related to the suspended processes to a temporary location within the management server 610. In other instances, the management server may transfer the information to a temporary cloud computing environment or cloud storage environment.

In some instances, the management server establishes a (new) second cloud computing environment based on the user's choices. It will be appreciated that the order of the process indicated herein may be altered as necessary. For example, the management server may establish the second cloud computing environment even before suspending the processes of the first cloud computing environment.

Finally, the management server causes the temporarily stored data to be transferred to the second cloud computing environment. The template variables corresponding to the second computing environment are initialized based on the template parameters retrieved from the first cloud computing environment. The data (that was uncompressed and unencrypted in the temporary storage location) is also transferred to the second cloud computing environment. The suspended processes are re-fired using the virtual servers in the second cloud computing environment 612.

Thus, methods and systems for cloud computing management have been described. The techniques introduced above can be implemented by using programmable circuitry programmed by software and/or firmware, or by using special-purpose hardwired circuitry, or by using a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A method, comprising:
providing, by a management server, a user with an option to select one or more third-party service providers from a plurality of service providers supported by the management server;
receiving, by the management server, the user's selection of a first third-party service provider and a second third-party service provider from the plurality of service providers;
establishing, by the management server, a customized cloud computing environment that includes a set of resources instantiated in the customized cloud computing environment by a set of physical servers operated by the first and second third-party service providers;
monitoring one or more performance metrics associated with the customized cloud computing environment, wherein the monitoring includes monitoring network communications between a first set of resources of the set of resources and a second set of resources of the set of resources, and further includes subsequent to establishing the customized cloud computing environment, monitoring one or more performance metrics associated with the customized cloud computing environment, and wherein the first set of resources is provided by the first third-party service provider and the second set of resources is provided by the second third-party service provider; and providing at least one of a performance report of the customized cloud computing environment and an alert relating to an issue associated with the customized cloud computing environment, the performance report based in part on the one or more performance metrics.

2. The method of claim 1, further comprising:

providing, by the management server, a plurality of options to enable the user to define the customized cloud computing environment; and receiving, by the management server, an input selection from the user to define the customized cloud computing environment, wherein the plurality of options includes one or more of:

a choice of redundancy;

a choice of storage capacity;

a choice of duration of the customized cloud computing environment;

a choice of layout of one or more servers associated with the cloud computing environment;

a choice of a geographic location of one or more physical servers operated by the one or more third-party service providers;

a choice of computing capacity of servers instantiated in the customized cloud computing environment; or a choice of one or more value-add services offered by the management server.

3. The method of claim 2, wherein establishing the customized cloud computing environment further comprises:

providing, by the management server, a plurality of session-options that match the user's input selection, each of the plurality of session-options corresponding to a particular configuration of a cloud computing environment, wherein a given session-option of the plurality of session-options includes configuration information pertinent to the given session-option, and the configuration information includes an indication of the first third-party service provider;

receiving, by the management server, a session-selection from the user corresponding to the user's selection of the first third-party service provider, wherein the session-selection is indicative of the user's desired configuration; and establishing, by the management server, the customized cloud computing environment according to the desired configuration.

4. The method of claim 3, wherein the configuration information includes one or more of:

an indication of a cost of the given session-option;

an indication of a duration of the given session-option;

an indication of a redundancy availability associated with the given session-option;

an indication of a number of servers available for instantiation in the given session-option; or an indication of an amount of storage available in association with the given session-option.

5. The method of claim 1, wherein the one or more performance metrics includes one or more of:

an indication of a load on a physical server associated with a virtual server instantiated in the customized cloud computing environment;

an indication of memory availability in the physical server;

an indication of a performance of a processor in the physical server; or an indication of a capacity of the processor.

6. The method of claim 1, wherein the management server establishes an instrumentation bootstrap in one or more virtual servers instantiated within the customized cloud computing environment.

7. The method of claim 1, further comprising:

upon request from the user, transferring, by the management server, one or more virtual servers included in the customized cloud computing environment to a second cloud computing environment.

8. The method of claim 7, wherein the second cloud computing environment is one of:

a new cloud computing environment with no virtual servers; or a preexisting cloud computing environment that includes one or more preexisting virtual servers.

9. The method of claim 7, wherein the transferring step further comprises:

suspending one or more process threads associated with each of the one or more virtual servers of the customized cloud computing environment;

retrieving configuration parameters associated with the customized cloud computing environment; and activating the one or more process threads and the configuration parameters in the second cloud computing environment.

10. A method comprising:

offering, by a management server, a centralized marketplace that enables a user to select a target third-party service provider from a plurality of target third-party service providers;

receiving, by the management server, the user's input selection of a first target third-party service provider and a second target third-party service provider, the first target third-party service provider being different from the second target third-party service provider;

establishing, by the management server, a customized cloud computing environment using a set of resources instantiated in the customized cloud computing environment by a set of physical servers operated by the first and second third-party service providers, wherein establishing the customized cloud computing environment includes establishing a first connection through a first interconnect with a first operating interface associated with the first third-party service provider, receiving first configuration information for the customized cloud computing environment from the first operating interface, establishing a second connection through a second interconnect with a second operating interface associated with the second third-party service provider, and receiving second configuration information for the customized cloud computing environment from the second operating interface;

subsequent to establishing the customized cloud computing environment, monitoring, by the management server, a performance metric associated with the customized cloud computing environment;

providing at least one of a performance report of the customized cloud computing environment and an alert relating to an issue associated with the customized cloud computing environment, the performance report based in part on the one or more performance metrics; and providing the first and second configuration information to the user.

11. The method of claim 10, further comprising:
providing, by the management server, a plurality of options to enable the user to define the customized cloud computing environment; and
receiving, by the management server, an input selection from the user to define the customized cloud computing environment, wherein the plurality of options includes one or more of:
a choice of redundancy;
a choice of storage capacity;
a choice of duration of the customized cloud computing environment;
a choice of layout of one or more servers associated with the cloud computing environment;
a choice of a geographic location of one or more physical servers operated by the plurality of third-party service providers;
a choice of a computing capacity of servers instantiated in the customized cloud computing environment; or
a choice of one or more value-add services offered by the management server.

12. The method of claim 11, further comprising:
providing, by the management server, one or more session-options, each session-option indicative of a particular cloud computing environment that matches the user's input selection, wherein a given session-option of the one or more session-options includes the first configuration information pertinent to the given session-option, the first configuration information including one or more of:
an indication of the first target third-party service-provider;
an indication of a cost of the given session-option;
an indication of a duration of the given session-option; an indication of a redundancy availability associated with the given session-option;
an indication of a number of servers available for instantiation in the given session-option; or
an indication of an amount of storage available in association with the given session-option.

13. The method of claim 10, further comprising:
providing, by the management server, a bidding option to enable the user to specify a desired cost for establishing the customized cloud computing environment.

14. The method of claim 13, further comprising:
providing, by the management server, one or more bidding-matches in response to the user's specification of the desired cost, each of the one or more bidding-matches indicative of a particular could computing environment that substantially matches the desired cost criterion.

15. The method of claim 13, further comprising:
if the management server is unable to identify a particular computing environment that substantially matches the desired cost specified by the user, providing, by the management server, an indication of availability of a new computing environment that substantially matches the desired cost specified by the user when the new computing environment becomes available at a later time.

16. The method of claim 10, further comprising:
providing, by the management server, a premium service associated with the customized cloud computing environment.

17. The method of claim 16, wherein the premium service includes one or more of:
an option to receive periodic performance reports;
an option to receive alerts in response to specified criteria;
an option to establish redundant storage for data; or
an option to transfer one or more virtual servers from the customized cloud computing environment to a different cloud computing environment.

18. The method of claim 10, wherein the performance metric includes one or more of:
an indication of a load on a physical server associated with a virtual server instantiated in the customized cloud computing environment;
an indication of memory availability in the physical server;
an indication of a number of process threads running on the physical server;
an indication of a performance of a process or in the physical server; or
an indication of a capacity of the processor.

19. A method of operating a cloud computing environment, the method comprising:
controlling, using a management server, access to a first cloud computing environment, including a first set of one or more virtual servers, wherein the first cloud computing environment operates based on computing resources of a first third-party service provider;
providing, by the management server, a plurality of options including a plurality of service providers to enable a user to request a transfer of the first set of virtual servers from the first cloud computing environment to a second cloud computing environment selected by the user, wherein the second cloud computing environment operates based on computing resources of a second third-party service provider, the first third-party service provider being different from the second third-party service provider;
receiving, by the management server, the request to transfer the first set of virtual servers from the first cloud computing environment to the second cloud computing environment; and
in response to the request:
suspending, by the management server, one or more process operations of each virtual server in the first set of virtual servers;
instantiating, by the management server, new process operations in a second set of one or more virtual servers in the second cloud computing environment, wherein the new process operations are based on the suspended one or more process operations of the first cloud computing environment;
retrieving configuration data associated with the first set of virtual servers;
compressing and encoding, by the management server, the configuration data prior to transferring to the second cloud computing environment; and
decompressing and decoding, by the management server, the configuration data subsequent to instantiating the second set of one or more virtual servers in the second cloud computing environment; and
transferring the uncompressed and unencrypted configuration data to be stored in association with the one or more new virtual servers of the second cloud computing environment.

20. The method of claim 19, wherein a number of virtual servers in the first set is different from a number of virtual servers in the second set.

21. The method of claim 19, wherein the management server operates as a temporary buffer for the configuration data before being copied to the second cloud computing environment.

22. The method of claim 19, wherein the suspended process operations are terminated subsequent to the instantiation of the new process operations in the second cloud computing environment.

23. The method of claim 19, wherein the management server translates the configuration data associated with the first computing environment to be adapted for use with the second computing environment based on a setup of the second computing environment.

24. The method of claim 19, further comprising:
in response to the request:
retrieving storage data associated with the first set of virtual servers;
compressing and encoding, by the management server, the storage data prior to transferring to the second cloud computing environment;
decompressing and decoding, by the management server, the storage data subsequent to instantiating the second set of one or more virtual servers in the second cloud computing environment; and
transferring the uncompressed and unencrypted storage data to be stored in association with the one or more new virtual servers of the second cloud computing environment.

25. The method of claim 24, wherein the transferring includes transferring the configuration data and/or storage data to the second cloud computing environment.

26. The method of claim 19, wherein the second cloud computing environment operates based on computing resources of the first third-party service provider.

27. The method of claim 19, wherein the computing resources of the first third-party service provider are controlled by an entity different from the computing resources of the second third-party service provider.

28. A system comprising:
a processor;
a memory storing code which, when executed by the processor, causes the network storage server to perform a process, including:
providing, by a management server, a user with an option to select one or more third-party service providers from a plurality of service providers supported by the management server;
receiving, by the management server, the user's selection of a first third-party service provider and a second third-party service provider from the plurality of service providers; and
establishing, by the management server, a customized cloud computing environment that includes a set of resources instantiated in the customized cloud computing environment by a set of physical servers operated by the first and second third-party service providers, and
monitoring one or more performance metrics associated with the customized cloud computing environment, wherein the monitoring includes monitoring network communications between a first set of resources of the set of resources and a second set of resources of the set of resources, and further includes subsequent to establishing the customized cloud computing environment, monitoring one or more performance metrics associated with the customized cloud computing environment, and wherein the first set of resources is provided by the first third-party service provider and the second set of resources is provided by the second third-party service provider; and
providing at least one of a performance report of the customized cloud computing environment and an alert relating to an issue associated with the customized cloud computing environment, the performance report based in part on the one or more performance metrics.

29. The system of claim 28, wherein the process further comprises:
providing, by the management server, a plurality of options to enable the user to define the customized cloud computing environment; and
receiving, by the management server, an input selection from the user to define the customized cloud computing environment, wherein the plurality of options includes one or more of:
a choice of redundancy;
a choice of storage capacity;
a choice of duration of the customized cloud computing environment;
a choice of layout of one or more servers associated with the cloud computing environment:
a choice of a geographic location of one or more physical servers operated by the one or more third-party service providers:
a choice of a computing capacity of servers instantiated in the customized cloud computing environment; or
a choice of one or more value-add services offered by the management server.

30. The system of claim 29, wherein establishing the customized cloud computing environment further comprises:
providing, by the management server, a plurality of session-options that match the user's input selection, each of the plurality of session-options corresponding to a particular configuration of a cloud computing environment, wherein a given session-option of the plurality of session-options includes configuration information pertinent to the given session-option, and the configuration information includes an indication of the first third-party service provider;
receiving, by the management server, a session-selection from the user corresponding to the user's selection of the first third-party service provider, wherein the session-selection is indicative of the user's desired configuration; and
establishing, by the management server, the customized cloud computing environment according to the desired configuration.

31. The system of claim 30, wherein the configuration information includes one or more of:
an indication of a cost of the given session-option;
an indication of a duration of the given session-option;
an indication of a redundancy availability associated with the given session-option;
an indication of a number of servers available for instantiation in the given session-option; or
an indication of an amount of storage available in association with the given session-option.

32. The system of claim 28, wherein the one or more performance metrics includes one or more of:
an indication of a load on a physical server associated with a virtual server instantiated in the customized cloud computing environment;
an indication of memory availability in the physical server;

an indication of a number of process threads running on the physical server;

an indication of a performance of a processor in the physical server; or an indication of a capacity of the processor.

33. The system of claim 28, wherein the process further comprises:

upon request from the user, transferring one or more virtual servers included in the customized cloud computing environment to a second cloud computing environment.

34. The system of claim 33, wherein the second cloud computing environment is one of:

a new cloud computing environment with no virtual servers; or a preexisting cloud computing environment that includes one or more preexisting virtual servers.

35. The system of claim 33, wherein the transferring further comprises:

suspending one or more process threads associated with each of the one or more virtual servers of the customized cloud computing environment;

retrieving configuration parameters associated with the customized cloud computing environment; and activating the one or more process threads and the configuration parameters in the second cloud computing environment.

36. A system comprising:

a processor;

a memory storing code which, when executed by the processor, causes the network storage server to perform a process, including:

offering a centralized marketplace that enables a user to select a target third-party service provider from a plurality of target third-party service providers;

receiving the user's input selection of a first target third-party service provider and a second target third-party service provider, the first target third-party service provider being different from the second target third-party service provider;

establishing a customized cloud computing environment using a set of resources instantiated in the customized cloud computing environment by a set of physical servers operated by the user selected first and second target third-party service providers, wherein establishing the customized cloud computing environment includes establishing a first connection through a first interconnect with a first operating interface associated with the first third-party service provider, receiving first configuration information for the customized cloud computing environment from the first operating interface, establishing a second connection through a second interconnect with a second operating interface associated with the second third-party service provider, and receiving second configuration information for the customized cloud computing environment from the second operating interface;

subsequent to establishing the customized cloud computing environment, monitoring a performance metric associated with the customized cloud computing environment;

providing at least one of a performance report of the customized cloud computing environment and an alert relating to an issue associated with the customized cloud computing environment, the performance report based in part on the one or more performance metrics; and providing the first and second configuration information to the user.

37. The system of claim 36, wherein the process further comprises:

providing a bidding option to enable the user to specify a desired cost for establishing the customized cloud computing environment.

38. The system of claim 37, wherein the process further comprises:

providing one or more bidding-matches in response to the user's specification of the desired cost, each of the one or more bidding-matches indicative of a particular cloud computing environment that substantially matches the desired cost criterion.

39. The system of claim 37, wherein the process further comprises:

if the system is unable to identify a particular computing environment that substantially matches the desired cost specified by the user, providing an indication of availability of a new computing environment that substantially matches the desired cost specified by the user when the new computing environment becomes available at a later time.

40. The system of claim 36, wherein the process further comprises:

providing a premium service associated with the customized cloud computing environment.

41. The system of claim 40, wherein the premium service includes one or more of:

an option to receive periodic performance reports;

an option to receive alerts in response to specified criteria; or an option to transfer one or more virtual servers from the customized cloud computing environment to a different cloud computing environment.

42. The system of claim 36, wherein the performance metric includes one or more of:

an indication of a load on a physical server associated with a virtual server instantiated in the customized cloud computing environment;

an indication of memory availability in the physical server;

an indication of a number of process threads running on the physical server;

an indication of a performance of a processor in the physical server; or an indication of a capacity of the processor.

43. A management system comprising:

a processor;

a memory storing code which, when executed by the processor, causes the network storage server to perform a process, including:

controlling access to a first cloud computing environment including a first set of one or more virtual servers, wherein the first cloud computing environment operates based on computing resources of a first third-party service provider;

providing a plurality of options including a plurality of service providers to enable a user to request a transfer of the first set of virtual servers from the first cloud computing environment to a second cloud computing environment selected by the user, wherein the second cloud computing environment operates based on computing resources of a second third-party service provider, wherein the first third-party service provider is different from the second third-party service provider;

receiving the request to transfer the first set of virtual servers from the first cloud computing environment to the second cloud computing environment; and in response to the request:

suspending, by the management server, one or more process operations of each virtual server in the first set of virtual servers;

instantiating, by the management server, new process operations in a second set of one or more virtual servers in the second cloud computing environment, wherein the new process operations are based on the suspended one or more process operations of the first cloud computing environment;

retrieving configuration data associated with the first set of virtual servers;

compressing and encoding, by the management server, the configuration data prior to transferring to the second cloud computing environment; and decompressing and decoding, by the management server, the configuration data subsequent to instantiating the second set of one or more virtual servers in the second cloud computing environment; and transferring the uncompressed and unencrypted configuration data to be stored in association with the one or more new virtual servers of the second cloud computing environment.

44. The system of claim 43, wherein a number of virtual servers in the first set is different from a number of virtual servers in the second set.

45. The system of claim 43, wherein the system operates as a temporary buffer for the storage and configuration data before being copied to the second cloud computing environment.

46. The system of claim 43, wherein the suspended process operations are terminated subsequent to the instantiation of the new process operations in the second cloud computing environment.

47. The system of claim 43, wherein the system translates the configuration data associated with the first computing environment to be adapted for use with the second computing environment based on a setup of the second computing environment.

48. The system of claim 43, wherein in response to the request, the system retrieves storage data associated with the first set of virtual servers, compresses and encodes the storage data prior to transferring to the second cloud computing environment, decompresses and decodes the storage data subsequent to instantiating the second set of one or more virtual servers in the second cloud computing environment, and transfers the uncompressed and unencrypted storage data to be stored in association with the one or more new virtual servers of the second cloud computing environment.

49. The system of claim 48, wherein the system transfers the storage data and/or the configuration data to the second cloud computing environment.

50. The system of claim 43, wherein the second cloud computing environment operates based on computing resources of the first third-party service provider.

* * * * *